(12) United States Patent  (10) Patent No.: US 7,730,165 B2
Shapiro  (45) Date of Patent: Jun. 1, 2010

(54) SYSTEM, METHOD, AND COMPUTER PROGRAM PRODUCT FOR REMOTELY DETERMINING THE CONFIGURATION OF A MULTI-MEDIA CONTENT USER

(75) Inventor: Jody J Shapiro, San Jose, CA (US)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 09/986,683

(22) Filed: Nov. 9, 2001

(65) Prior Publication Data

US 2003/0093507 A1   May 15, 2003

(51) Int. Cl.
*G06F 15/177* (2006.01)
(52) U.S. Cl. .................. 709/220; 709/203; 709/217; 709/231
(58) Field of Classification Search .................. 709/222, 709/228, 231–233, 217–219, 220, 203
See application file for complete search history.

(56) References Cited

U.S. PATENT DOCUMENTS 3,394,352 A   7/1968   Wernikoff et al.
3,913,093 A   10/1975  De Vincentiis et al.

(Continued)

FOREIGN PATENT DOCUMENTS

EP   0 727 888   8/1996

(Continued)

OTHER PUBLICATIONS

"Broadcast Help," [retrieved Aug. 20, 2002] at http://help.yahoo.com/help/us/bcst/ , 2 pages.

(Continued)

*Primary Examiner*—Shawki S Ismail
(74) *Attorney, Agent, or Firm*—Frommer Lawrence & Haug LLP; William S. Frommer; Ellen Marcie Emas

(57) ABSTRACT

A system, method, and computer program product for determining the configuration of an end user's computer system. In particular, the media players and network connection speed of the user are determined. This configuration information is then received by a delivery management server. The configuration information is used to format multi-media content for delivery to the user. Because the content is formatted according to the configuration information, the content is compatible with the user's configuration. The configuration determination process involves server contact code placed in the web page of the content provider. When the web page is loaded by the user, the server contact code directs the browser to retrieve code from the delivery management server. When the code is executed by the user, the media player of the user is determined. This information is saved in cookies at the user and is sent to the delivery management server. If the configuration information is indeterminate or incomplete, the user is presented with a preferences page in which the user can indicate the configuration. The preferences page also contains a mechanism for determining the connection speed of the user. The preferences page can also make specific recommendations to the user, e.g., recommend that the user choose a specific media player. The preferences page contains a block of data having a known size. The time required to transfer the block is measured, and the connection speed is then calculated and provided to the delivery management server.

6 Claims, 6 Drawing Sheets

U.S. PATENT DOCUMENTS

| | | | |
|---|---|---|---|
| 5,526,397 | A | 6/1996 | Lohman |
| 5,657,015 | A | 8/1997 | Nakajima et al. |
| 5,796,829 | A | 8/1998 | Newby et al. |
| 5,818,537 | A | 10/1998 | Enokida et al. |
| 5,818,933 | A | 10/1998 | Kambe et al. |
| 5,838,927 | A | 11/1998 | Gillon et al. |
| 5,848,134 | A | 12/1998 | Sekiguchi et al. |
| 5,949,876 | A | 9/1999 | Ginter et al. |
| 5,991,795 | A | 11/1999 | Howard et al. |
| 6,026,366 | A * | 2/2000 | Grube ............................ 705/10 |
| 6,122,290 | A | 9/2000 | Kawamata |
| 6,247,050 | B1 | 6/2001 | Tso et al. |
| 6,292,834 | B1 * | 9/2001 | Ravi et al. .................... 709/233 |
| 6,441,831 | B1 * | 8/2002 | Abramowitz et al. ........ 715/716 |
| 6,446,130 | B1 * | 9/2002 | Grapes ......................... 709/231 |
| 6,594,699 | B1 * | 7/2003 | Sahai et al. .................. 709/228 |
| 6,601,009 | B2 * | 7/2003 | Florschuetz ................. 702/124 |
| 6,711,682 | B1 * | 3/2004 | Capps .......................... 713/184 |
| 6,721,558 | B1 * | 4/2004 | Saad ............................ 455/424 |
| 6,795,863 | B1 * | 9/2004 | Doty, Jr. ...................... 709/231 |
| 6,848,004 | B1 * | 1/2005 | Chang et al. ................. 709/232 |
| 6,925,495 | B2 * | 8/2005 | Hegde et al. ................. 709/223 |
| 2002/0112052 | A1 * | 8/2002 | Brittingham et al. ........ 709/224 |
| 2003/0191771 | A1 * | 10/2003 | Arrouye et al. ............. 707/101 |
| 2004/0098446 | A1 * | 5/2004 | Styles et al. ................. 709/200 |
| 2008/0147715 | A1 * | 6/2008 | Woodward et al. .......... 707/102 |

FOREIGN PATENT DOCUMENTS

| | | |
|---|---|---|
| EP | 0 992 922 | 4/2000 |
| EP | 1 026 872 | 8/2000 |
| EP | 1 032 217 | 8/2000 |
| EP | 1 043 655 | 10/2000 |
| WO | WO 00 72517 | 11/2000 |

OTHER PUBLICATIONS

"BrowserHawk features and benefits," [retrieved Aug. 20, 2002] at http://www.cyscape.com/products/bhawk/features.asp, 8 pages.

"Yahoo! Broadcast," [retrieved Aug. 20, 2002] at http://broadcast.yahoo.com/home.html, 3 pages.

"Larry Bothillier's Streaming Media Player Detection Tutorial—Client-side code," [retrieved Sep. 20, 2002] at http://www.emediacommunications.biz/sm5/sm5_clientcode.html, 4 pages.

"Streaming Media Player/Connection Speed Detection Tutorial," [retrieved Sep. 20, 2002] at http://www.emediacommunications.biz/sm5/index.html, 2 pages.

A flowchart, [retrieved Sep. 20, 2002] at http://www.emediacommunications.biz/sm5/playDetectFlow.gif, 1 page.

A flowchart, [retrieved Sep. 20, 2002] at http://www.emediacommunications.biz/sm5/playerDataObiectUML.gif, 1 page.

Rakesh Mohan et al., Content Adaptation Framework: Bringing the Internet to Information Appliances (IBM), Multimedia Services and Technology Issues, Global Telecommunications Conference—Globecom '99, pp. 2015-2021.

Richard Han et at., Dynamic Adaptation in an Image Transcoding Proxy for Mobile Web Browsing (IBM) IEEE Personal Communications, Dec. 1998, pp. 8-17.

Youn J et al: "Video Transcoding for Multiple Clients" Proceedings of the SPIE, SPIE, Bellingham, VA, US, vol. 4067, No. PART 1-3, Jun. 2000, pp. 76-85, XP008012075 ISSN: 0277-786X.

Smith J R et al: "Content-based transcoding of images in the Internet" Image Processing. 1998 ICIP 98. Proceedings. 1998 International Conference on Chicago, IL, USA Oct. 4-7, 1998, Los Alamitos, CA, USA,IEEE Comput. Soc, US, vol. 3, Oct. 4, 1998, pp. 7-11, XP010586855 ISBN: 0-8186-8821-1.

Larry Bouthillier: "Detecting Streaming Media Players and Connection Speed Tutorial" [Online] Feb. 18, 2003, XP002467766 Retrieved from the Internet: URL:http://www.streamingmedia.com/article.asp?id=8396&page=1> [retrieved on Feb. 5, 2008].

Beyssac P: "Bandwidth Ping" [Online] Feb. 18, 2003, Internet, XP002230332 Retrieved from the Internet: URL:http://www.cnam.fr/reseau/bing.html> [retrieved on 2008].

Strauss J et al: "A Measurement Study of Available Bandwidth Estimation Tools" Proceedings of the 2003 ACM SIGCOMM Internet Measurement Conference. IMC 2003. Miami Beach, FL, Oct. 27-29, 2003; [Proceedings of the ACM SIGCOMM Internet Measurement Conference. IMC], New York, NY: ACM, US, Oct. 27, 2003, pp. 1-6, XP002378475.

Lai K et al: "Measuring Link Bandwidths Using a Deterministic Model of Packet Delay" Computer Communication Review, ACM, New York, NY, US, vol. 30, No. 4, Oct. 1, 2000, pp. 283-294, XP001059986 ISSN: 0146-4833.

* cited by examiner

SYSTEM, METHOD, AND COMPUTER PROGRAM PRODUCT FOR REMOTELY DETERMINING THE CONFIGURATION OF A MULTI-MEDIA CONTENT USER

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/COMPUTER PROGRAM LISTING APPENDIX

Not applicable.

BACKGROUND OF THE INVENTION

1. Field of the Invention

The invention described herein relates to information systems, and more particularly to delivery of multi-media content.

2. Background Art

Given the availability of data networks and the availability of high-speed data connections, it is now commonplace for end users to access multi-media content. A number of web sites now offer audio and video to users. Ideally, the user simply clicks on a link or control presented in a web page, and one or more multi-media files are delivered. If the user has the appropriate hardware and software configuration, the file can then be played.

There are currently a significant variety of user configurations, however. Some users have INTEL based personal computers (PCs), while others may have APPLE MACINTOSH computers. Different operating systems are also present. Some users will have a version MICROSOFT WINDOWS, from MICROSOFT, Inc., while others have a version of MAC OS, from APPLE, Inc. Moreover, each of these operating systems now has several versions in the user community. In addition, a number of software programs are now available to play multimedia on the computers of users. These players include QUICKTIME (from APPLE, Inc.), REALPLAYER (from REALNETWORKS, Inc.), and WINDOWS MEDIA PLAYER (from MICROSOFT, Inc.). Moreover, each of these players has several versions that are currently available in the user community. Finally, different users may be operating at different data rates. Some users may have a high speed broadband connection, while others may have a 56K modem connection.

Given this variety of platforms, operating systems, players, and data rates, a content provider is faced with the problem of how to format the content to be delivered. Incorrect formatting would result in the delivery of content that was incompatible with a user's configuration. This could result in content that is unusable. If the content is usable, the content may be in a format that fails to take advantage of all the features available in the user's configuration, such that the content, as experienced by the user, is not as rich as it could be.

In the past, content providers have addressed this problem by choosing some set of common user configurations. The provider, for example, might identify the most common media players and versions thereof. The provider formats the content for each of these players and stores these assorted versions of the content. The provider would then develop a menu to be provided to the user, in effect asking which media player the user has, or, if the user has more than one, which player is preferred by the user. The user then makes a selection, and the content that has been pre-encoded in the selected format is delivered to the user.

This solution has limitations. First, it is relatively inflexible. The number of options is limited. A user's specific configuration may not have been presented as an option in the menu. And if an end user has more than one media player available to him, the user's preferred choice may not have been listed as an option. Also, the solution above requires user input each time. The user might not want to be queried. The user may instead prefer that formatting be resolved for him. In other situations, the user might not know the information requested by the menu. The user may not know what version of a media player he has. This solution also requires that a content provider change their menus and re-encode content whenever new players (or new versions of existing players) become prevalent. The above solution, therefore, is inflexible and burdensome to both the user and the provider.

What is needed, therefore, is a way to determine a user's configuration so as to provide the user with content in a compatible format that leads to the optimal viewing experience. In addition, determination of the configuration should be made in a manner that minimizes the need for user input and is otherwise user-friendly.

BRIEF SUMMARY OF THE INVENTION

The invention described herein is a system, method, and computer program product for determining the configuration of an end user's computer system. In particular, the invention remotely determines the media players and network connection speed of the user. This configuration information is then received by a delivery management server, and used in the formatting of multi-media content for delivery to the user. Because the content is formatted according to the configuration information, the content is compatible with the user's configuration, and moreover, is tailored to provide the user with the optimal multi-media experience.

In an embodiment of the invention, the configuration determination process involves server contact code that is placed in the web page of the content provider. When the web page is loaded by the user, the server contact code directs the browser to retrieve scripts from the delivery management server. When the scripts are executed by the user, the media player of the user is determined. This information is saved in cookies at the user and is sent to the delivery management server. The configuration information can then be used by a transcoder that formats the media content according to the configuration information.

If the configuration information is indeterminate or incomplete, the user is presented with a preferences page in which the user can indicate the configuration. This configuration, as determined through the preferences page, is also stored in cookies and sent to the delivery management server to allow formatting of content. The preferences page can also make specific recommendations to the user, e.g., recommend that the user choose a specific media player.

In an embodiment of the invention, the preferences page also contains a mechanism for determining the connection speed of the user. The preferences page contains a block of data having a known size. The time required to transfer the block is measured, and the connection speed is then calculated and provided to the delivery management server.

The foregoing and other features and advantages of the invention will be apparent from the following, more particular description of a preferred embodiment of the invention, as illustrated in the accompanying drawings.

BRIEF DESCRIPTION OF THE DRAWINGS/FIGURES

DETAILED DESCRIPTION OF THE INVENTION

Figure 1:
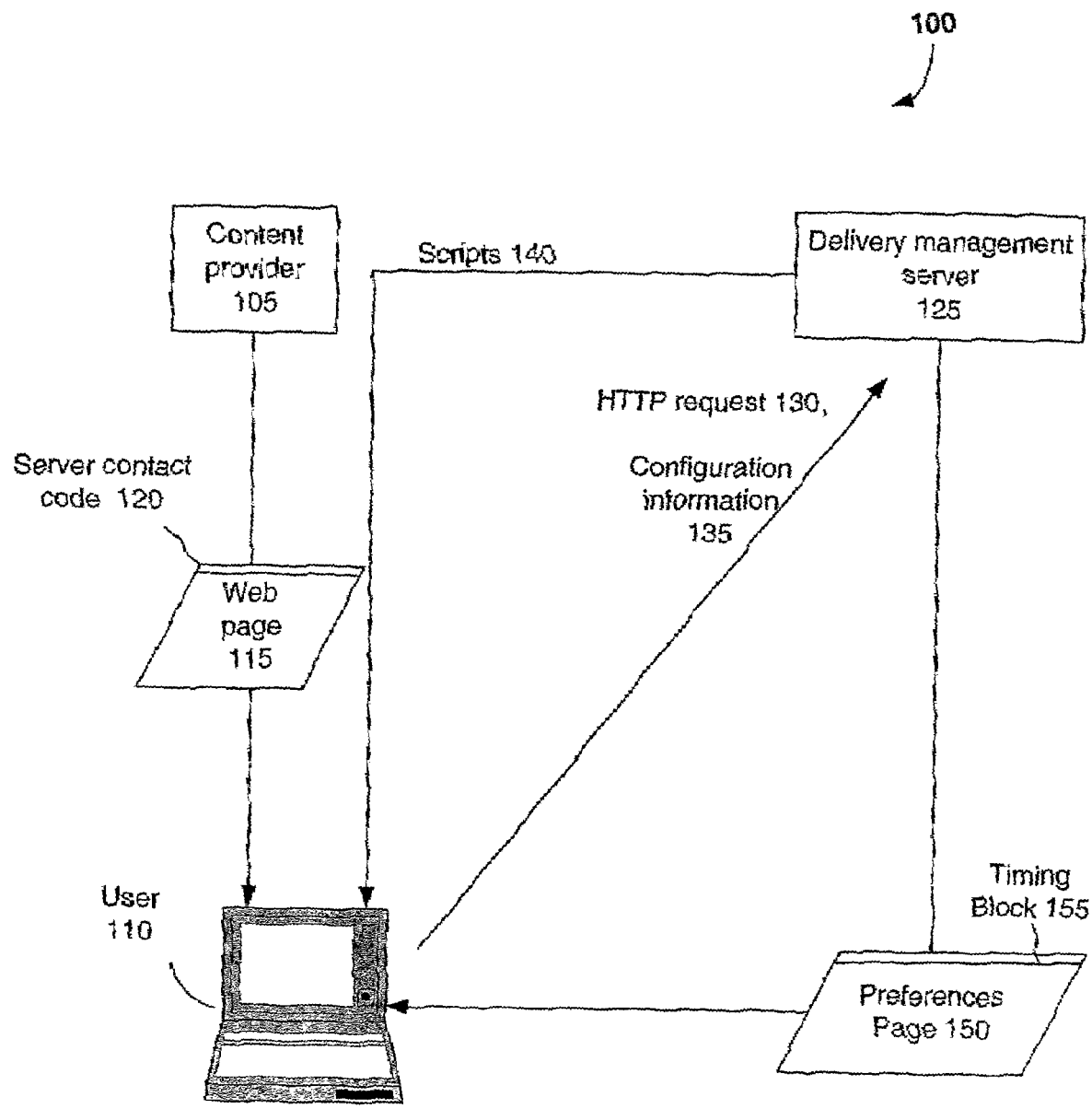
FIG. 1 illustrates the general architecture of an embodiment of the invention.

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

The invention described herein is a system, method, and computer program product that allows the remote determination of a user's computer system configuration. This allows multimedia content destined for that computer to be formatted in a manner compatible with the user's configuration. If sufficient configuration information is obtained, the content can be formatted so as to provide the best possible media experience for the user.

Note that in the description that follows, the concept of a user's computer is defined broadly to include the full range of programmable or programmed devices. A user's computer can be, but is not limited to, a personal computer or other workstation, a laptop, a palmtop, a personal data assistant, or a cell phone.

In an embodiment of the invention, server contact code is contained in a web page sent by a content provider to the user. The server contact code retrieves one or more scripts from a delivery management server. The scripts enable the determination of configuration information of the user's computer system. In an embodiment of the invention, the configuration information comprises the identity and version of the user's media player(s). The configuration information is then returned to the delivery management server. The configuration information can then be used to format the multi-media content appropriately. In an embodiment of the invention, configuration information is also stored locally at the user's computer in the form of cookies. In subsequent hypertext transfer protocol (HTTP) requests, the cookies can be sent to the delivery management server as a way of conveying the configuration information.

If the configuration information is determined to be incomplete or potentially outdated, an additional web page is opened. This is a preferences page, where the user can specify his configuration (e.g., his available or preferred media player type and version, and/or a preferred connection speed) to the delivery management server. The preferences page can also be used to recommend that the user choose a specific media player.

In an embodiment of the invention, the preferences page includes a block of data of known size. This block is transferred into the user's computer as a part of the preferences page. The time required to transfer this block of data is measured in order to determine the connection speed of the user's computer. The connection speed represents an additional piece of configuration information. The connection speed is also stored locally at the user's computer in the form of a cookie. This cookie can also be sent to the delivery management server as a way of conveying the user's connection rate to the delivery management server.

II. System

The overall architecture of the an embodiment of the invention includes server contact code embedded in a web page of a content provider. The server contact code directs the user's browser to a delivery management server, which sends one or more scripts to the user. Execution of the scripts can identify the type and version of the user's media player. This delivery management server receives this information from the user. The configuration information can eventually be used to format multi-media content for delivery to the user.

One embodiment of the system of the invention is illustrated in FIG. 1. A content provider 105 is shown delivering information to a user 110. Included in web page 115 is server contact code 120. When the browser of user 110 accesses server contact code 120, the browser establishes contact with delivery management server 125 and asks for one or more player detection scripts 140. Server 125 responds by sending scripts 140 to user 110. In a manner that will be described in greater detail below, the scripts 140, when executed, determine configuration information 135 for user 110. In an embodiment of the invention, this configuration information is stored with user 110 by a process of setting cookies that contain configuration information 135. The cookies are retained by user 110, and when user 110 makes the HTTP request 130 to access the content, configuration information 135, in the form of the cookies, is sent to delivery management server 125. A transcoder (not shown) formats the multimedia content in a manner specified by configuration information 135. The resulting formatted content can then be delivered to user 110 through a streaming server (not shown).

If configuration information 135 is not available (or otherwise requires clarification), an additional script, provided to user 110 as one of the scripts 140, opens a new window that loads a preferences web page 150. With this page, user 110 can explicitly identify configuration information 135 (e.g., the player type and version) through a user interface in preferences page 150. As before, the configuration information 135 can be retained at user 110 in the form of cookies and forwarded to delivery management server 125.

In an embodiment of the invention, a recommendation can be made by the delivery management server to the user, through the preferences page 150, as to a particular media player that the user can or should select. Such a recommendation is based on what is known about the user's options. In such an embodiment of the preferences page 150, the recommendation can be conveyed through a portion of the page. This portion can be thought of as a server interface, since the server communicates to the user through this interface.

As will be described in greater detail below, the preferences page includes a block of data 155 having a known size. The transfer of the block 155 is timed in order to determine the connection speed of the user 10. In an embodiment of the invention, block 155 (known hereinafter as the timing block) is incorporated in an HTML comment in the preferences page 150.

In some contexts of the invention, the delivery management server 125 is one of a set of such servers. Here, the set of delivery management servers services a community of users by means of the invention described herein. Given a user's request for content, the user would be assigned to a specific delivery management server through a selection mechanism that balances the load created by multiple users.

In an embodiment of the invention, the functionality of delivery management server 125 is embodied in a viewer web server interface to a transcoding engine. The transcoding engine, in general, receives content from a content provider and formats ("transcodes") the content in a manner that makes it usable by user 110. The viewer web server interface is a network interface between the transcoding engine and the user 110, that allows content to be requested by user 110. The viewer web server interface receives and processes a content request from the user 110, thereby initiating the transcoding and delivery of the requested content to the user 110. The viewer web server interface sends a reply to user 110's request, redirecting the user 110 to an appropriate streaming server from which to receive the requested media content. Formatted ("transcoded") content is then streamed to the user 110 by a streaming server and/or proxy server (also a part of the transcoding engine). Such a transcoding engine is described in greater detail in U.S. Pat. No. 6,407,680, and incorporated by reference herein in its entirety. Alternatively, the delivery management server 125 and the viewer web server interface can be implemented as separate servers.

Note that the invention described herein can be implemented in a variety of organizational contexts. For example, the transcoding and delivery management operations described above can be performed by a delivery management service. This service may be, for example, a separate organization or business entity independent of the content provider 105. In this case, web page 115 may be developed by content provider 105 independently of the delivery management service. Web page 115 could then include a logo or other branding images, and/or a "look and feel" specific to content provider 105. Likewise, preferences page 150, though delivered to user 110 by delivery management server 125, could also be developed by content provider 105 independent of the delivery management service.

Independence of the delivery management service and content provider 105 would also allow the delivery management service to make service changes on its own. The delivery management service would be free to upgrade its service by adding or otherwise modifying functionality. Player detection scripts 140 could be improved, for example, so as to make the player detection process faster or more comprehensive, independent of a specific content provider 105. The transcoding process could also be upgraded independent of content provider 105, to accommodate additional media formats or to provide faster transcoding, for example.

Figure 2:
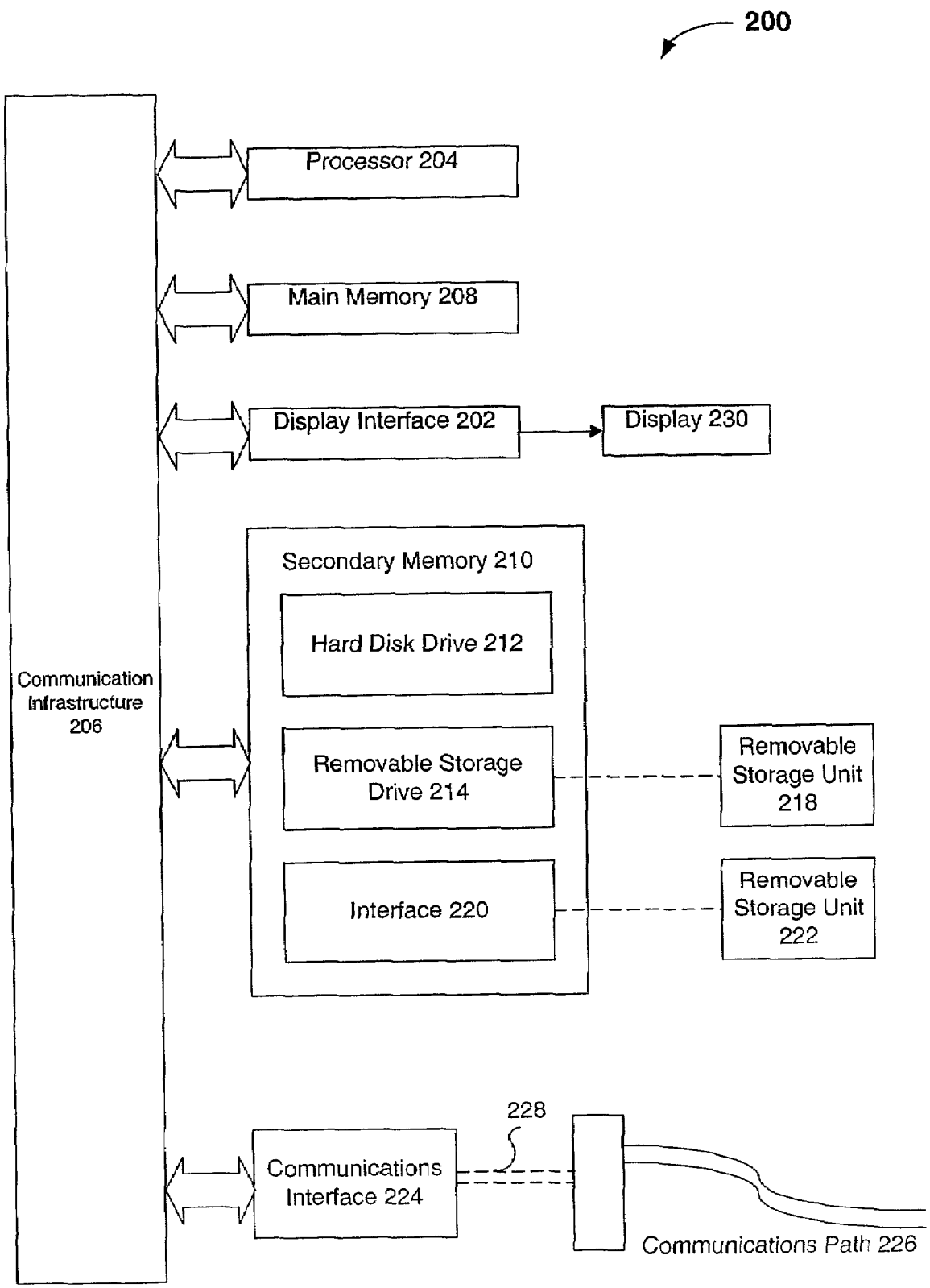
FIG. 2 is a block diagram illustrating the computing environment of an embodiment of the invention.

The delivery management server 125 may be implemented using hardware, software or a combination thereof. In particular, server 125 may be implemented using a computer system or other processing system. An example of such a computer system 200 is shown in FIG. 2. The computer system 200 includes one or more processors, such as processor 204. The processor 204 is connected to a communication infrastructure 206 (e.g., a bus or network). Various software embodiments can be described in terms of this exemplary computer system. After reading this description, it will become apparent to a person skilled in the relevant art how to implement the invention using other computer systems and/or computer architectures.

Computer system 200 also includes a main memory 208, preferably random access memory (RAM), and may also include a secondary memory 210.

The secondary memory 210 may include, for example, a hard disk drive 212 and/or a removable storage drive 214, representing a magnetic tape drive, an optical disk drive, etc. The removable storage drive 214 reads from and/or writes to a removable storage unit 218 in a well known manner. Removable storage unit 218 represents a magnetic tape, optical disk, etc. As will be appreciated, the removable storage unit 218 includes a computer usable storage medium having stored therein computer software and/or data.

Secondary memory 210 can also include other similar means for allowing computer programs or input data to be loaded into computer system 200. Such means may include, for example, a removable storage unit 222 and an interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a PCMCIA slot and card, etc. Software and data transferred via communications interface 224 are in the form of signals 228 which may be electronic, electromagnetic, optical or other signals capable of being received by communications interface 224. These signals 228 are provided to communications interface 224 via a communications path (i.e., channel) 226. This channel 226 carries signals 228 into and out of computer system 200, and may be implemented using wire or cable, fiber optics, a phone line, a cellular phone link, an RF link and other communications channels. In an embodiment of the invention, signals 228 can convey information required by the delivery management server 125, such as HTTP request 130 and configuration information 135. Signals 228 can also convey information to user 110, such as scripts 140 and preferences page 150.

In this document, the terms "computer program medium" and "computer usable medium" are used to generally refer to media such as removable storage drive 214, a hard disk installed in hard disk drive 212, and signals 228. These computer program products are means for providing software to computer system 200. The invention is directed in part to such computer program products.

Computer programs (also called computer control logic) are stored in main memory 208 and/or secondary memory 210. Computer programs may also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

III. Method

In the method of the invention, the configuration information of a user's computer is determined and sent to a delivery management server. The delivery management server then passes the configuration information to a transcoder that formats multi-media content according to the configuration information. The formatted content can then be sent to the user.

Figure 3:
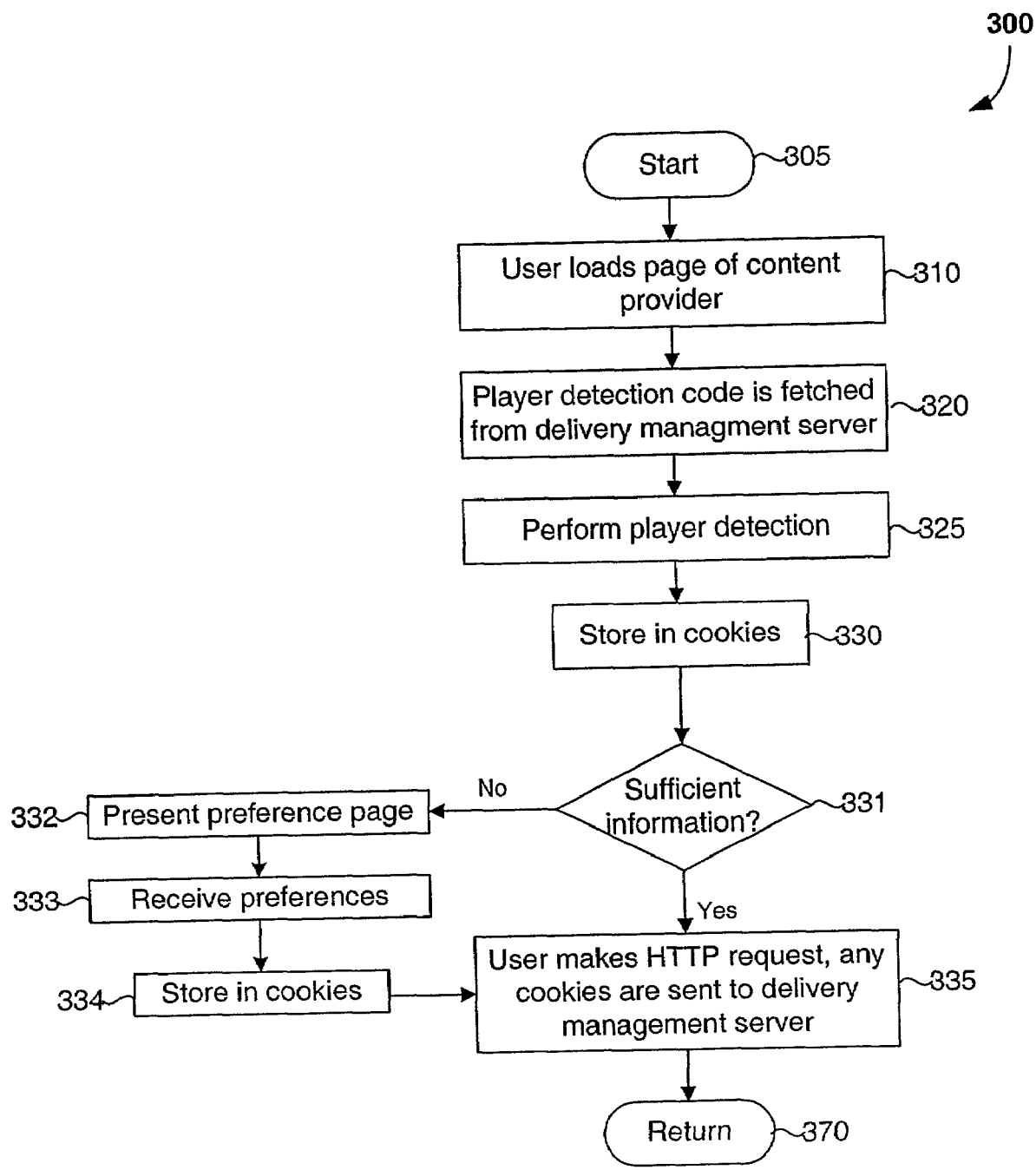
FIG. 3 is a flow chart illustrating the overall process of an embodiment of the invention.

The overall process of the invention is illustrated in FIG. 3. The process begins at step 305. In step 310, the user begins loading a web page of a content provider. As described in Section II, the web page contains server contact code which directs the user's browser to the delivery management server. In an embodiment of the invention, this is accomplished in an HTML header of the content provider's web page. For example, the HTML header could contain the following server contact code:

```
<SCRIPT SRC="http://js.genericmedia.net/
    js"LANGUAGE=javascript></SRC>
``` where "js.genericmedia.net" represents the delivery management server.

In an embodiment of the invention, execution of the server contact code is initiated by an action of the user, such as clicking on a control or link in the content provider's web page, or by entering an explicit command. In an alternative embodiment, the server contact code is executed automatically after loading the web page.

In step 320, the user's browser fetches player detection code from the delivery management server ("js" in the example above). In step 325, the media players that can be used by the user are determined. This step will be described in greater detail below. In step 330, the identity of the media players is recorded in one or more cookies in the user's computer. This step will also be described in greater detail below.

In conjunction with this step, a decision is made at the delivery management server (step 331) as to whether the received configuration information is sufficient to format the requested multi-media content. If cookies are received and verified as having valid settings, a minimal HTTP response is sent back, implying validity. If the received configuration information is sufficient to format the requested multi-media content, processing continues at step 335, described below.

If js does not receive valid cookies (i.e., if configuration information at the user is insufficient or nonexistent), the method continues at step 332. In step 332 a preferences page is displayed for the user. In an embodiment of the invention, this is accomplished by sending the user a segment of javascript that opens a new window which loads the preferences page. The preferences page allows the user to deliberately indicate to the delivery management server the configuration or preferences of the user with respect to the media player, and/or the user's connection speed. In an embodiment of the invention, the preferences page can also recommend to the user that a specific media player be chosen. Also, as will be described in greater detail below, the preferences page includes a mechanism through which the connection speed of the user's computer can be determined and relayed to the delivery management server.

In step 333, the preferences provided by the user are received by the user's computer. In step 334, the preferences are stored in cookies. Processing then continues at step 335.

In step 335, the user requests the multi-media content, made available by the content provider through a web page, by making an HTTP request. Such a request can be made, for example, by clicking on some region of the content provider's web page. As a part of this request, any cookies that contain configuration information are sent to the delivery management server. The cookies could, for example, describe the media player type and version. The cookies could also store the measured connection speed, as well as any preferred connection speed that the user might have. The user may, for example, wish to use only a portion of the available bandwidth for streaming. Here, the user would choose a slower speed than the maximum permitted by the user's configuration. The process concludes at step 370.

An example of an HTTP request ("GET") is as follows. Existing cookies (gmPlayers, gmPlayerPref, and gmBitratePref) are sent to the delivery management server as part of the GET command:

GET/xc?p=keith&s=media/Trailer.mov&v=1 HTTP/1.1
Accept: image/gif, image/x-xbitmap, image/jpeg, image/pjpeg, application/vnd.ms-powerpoint, application/vnd.ms-excel, application/msword, */*
Accept-Language: en-us
Accept-Encoding: gzip, deflate
User-Agent: Mozilla/4.0 (compatible; MSIE 5.5; Windows NT 5.0)
Host: xc.genericmedia.net
Connection: Keep-Alive
Cookie:gmPlayers=v1%2F%2FQuickTime-4.12%2F%2FReal-6.0.7.788%2F%2FWMP-6.4%2F%2F; gmPlayerPref=real; gmBitratePref=300000

The server uses the URL information and cookie information to decide to transcode the movie "media/Trailer.mov" (in user Keith's account) to a 300 kbps encoding suited for RealPlayer G2:

HTTP/1.1 200 OK
Date: Mon, 16 Jul. 2001 23:52:00 GMT
Server: Apache/1.3.14 (Unix) mod_perl/1.24
Connection: close
Expires: Thu, 1 Dec. 1994 16:00:00 GMT
Pragma: no-cache, no-store, must-revalidate, no-transform
Transfer-Encoding: chunked
Content-Type: audio/x-pn-realaudio
41
rtsp://64.124.76.136:554/cache/Mlk3JeFIY0209200d7dn-a/Trailer.rm
0

Note that a user may be configured with more than one media player. If so, it may be unclear how to format the content, i.e., which player to choose. Moreover, the user may have a particular preference for one player over another. The preferences page provides a way to resolve these situations, by letting the user convey a player preference to the delivery management server. In an embodiment of the invention, the preferences page can convey a recommendation to the user as to which media player might provide the best results.

There may also be cases where the above process fails to identify the user's configuration with certainty. The player detection process may not be able to unambiguously ascertain the user's media player, for example, and the user might not know enough to answer the queries on the preferences page. In such cases, the delivery management server may make one or more inferences based on what is known about the user's configuration. For example, if it is known that the user has a MACINTOSH platform, it can generally be assumed that QUICKTIME is available on the platform, since MACINTOSH computers are often equipped with QUICKTIME. Other such associations may also be used to infer configuration information that is otherwise unavailable. In an embodiment of the invention, confirmation of such an inference can be had by soliciting the user for confirmation, through the preferences page.

Figure 4:
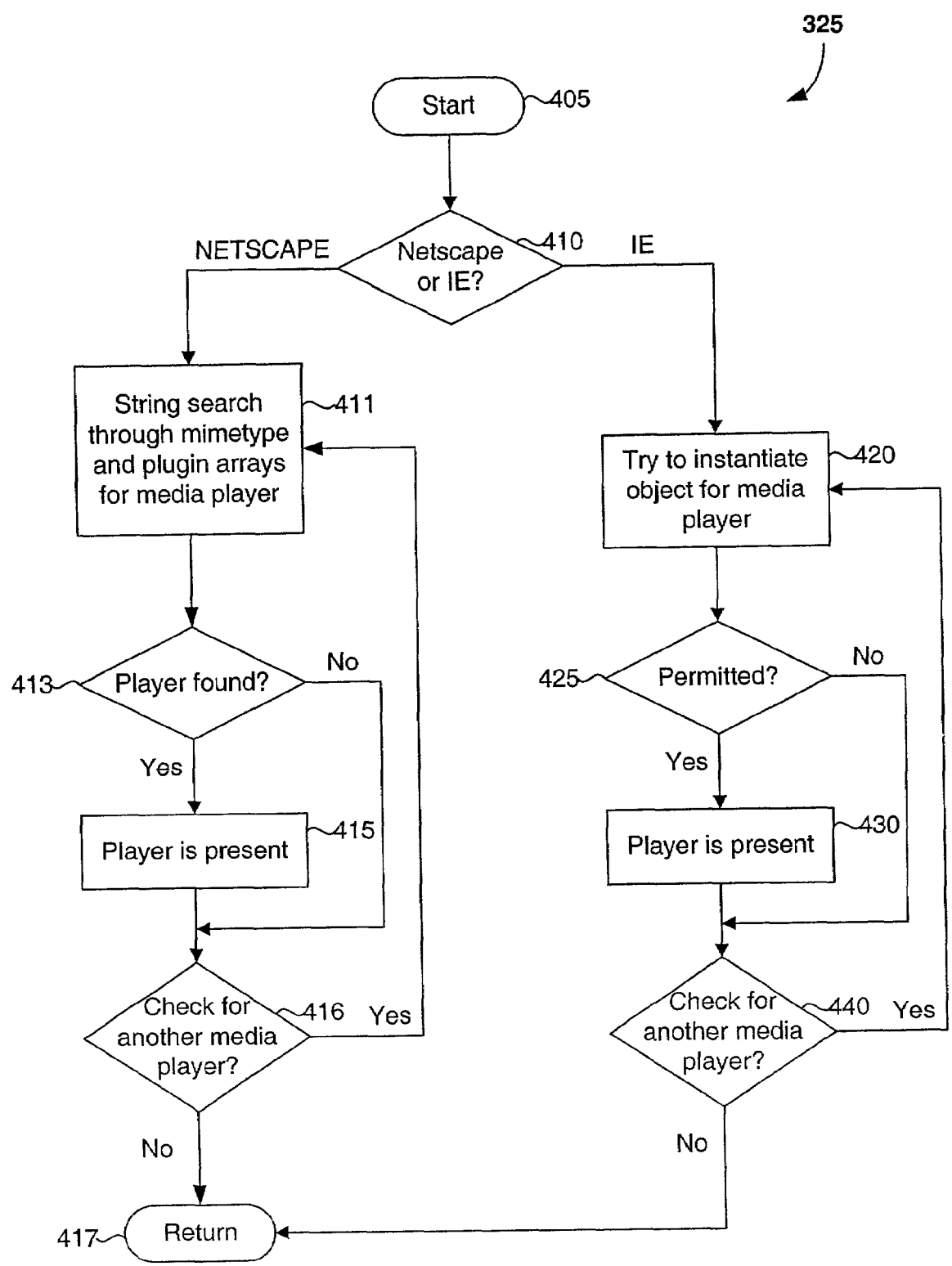
FIG. 4 is a flow chart illustrating the process of media player detection, according to an embodiment of the invention.

Step 325 above, the step of performing player detection, is described in greater detail in FIG. 4. This process begins at step 405. In step 410, a determination is made as to what browser the user has. Typically, the user's browser will be either a version of NETSCAPE NAVIGATOR, or a version of INTERNET EXPLORER (IE). If the user has NETSCAPE NAVIGATOR, then the process continues at step 411. In step 411, a string search for a given media player is performed through the resident mimetype array and plugin array. The mimetype array is a mapping of what application to load upon receiving a response with a given mimetype. Any given media player typically has its own mimetype. The plugin array is a listing of all browser plugins that have been installed; typically, each has registered a corresponding mimetype. As a result, these arrays will typically contain character strings that indicate the media player(s) resident on the user's computer. QUICKTIME is indicated by the string "QuickTime" for example, and WINDOWS MEDIA PLAYER is indicated by the string "video/x-msvideo".

If in step 413 the string search is successful, then the player is determined to be present in step 415. Otherwise, processing continues at step 416. In step 416 a determination is made as to whether another media player is to be sought. If so, processing returns to step 411, and a string search is conducted for another media player. In the illustrated embodiment, therefore, multiple string searches will generally be performed, although the invention can be implemented to perform a single search. The process concludes at step 417.

Note that different versions of a given player may be registered with the browser using slightly different names or properties. Detection of these distinctions by string searches can provide information as to specific versions. In an embodiment of the invention, the string searches are implemented using javascript.

If, in step 410, it is determined that the user's browser is INTERNET EXPLORER, then the process continues at step 420. Here, the browser is asked to instantiate an object for a given media player and version. In an embodiment of the invention, this instantiation is done using Vbscript. Creation of a REALPLAYER version 5 object, for example, would be attempted with the statement CreateObject("RealPlayer.RealPlayer(tm) ActiveX Control (32-bit)".

If, in step 425, this instantiation is permitted, this implies that the media player is in fact present on the user's computer, as shown in step 430. The process then continues at step 440. If, in step 425, instantiation of the given media player object is not permitted, then it can be assumed that the media player is not resident at the user's computer. In step 440, a determination is made as to whether the presence of any other media player should be ascertained. If so, the process returns to step 420 and another attempt will be made, this time to instantiate an object for a different media player. If, in step 440, a determination is made that no other media player will be sought, then the process concludes at step 417. Note that differences between players, especially differences between versions of a player, can be detected by corresponding differences in how player objects are instantiated in step 420. Also, for player objects that support version queries (e.g., QUICKTIME and REALPLAYER), the player can be asked directly about its version.

Figure 5:
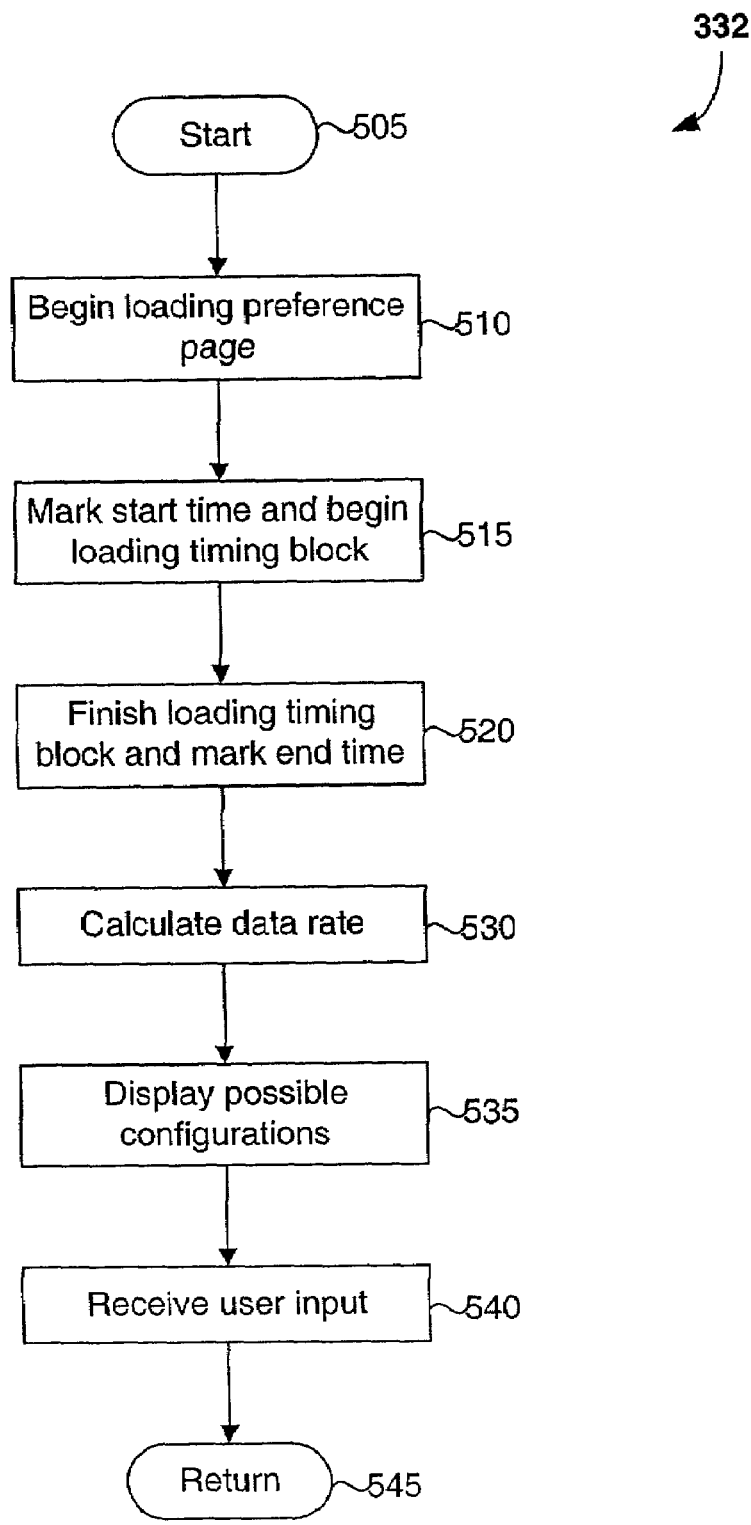
FIG. 5 is a flow chart illustrating the process of presenting a preferences page to the user, according to an embodiment of the invention.

Step 355 above, the step of presenting a preferences page to the user, is illustrated in greater detail in FIG. 5 according to an embodiment of the invention. The process begins at step 505. In step 510, the preferences page is loaded from the delivery management server. In step 515, the transfer of a block of data of known size, stored within the preferences page, begins. The transfer of this block is timed to determine the user's connection speed. This block is denoted hereinafter as a timing block. In an embodiment of the invention, the timing block is included in the preferences page as an HTML comment. As a result the browser ignores the timing block for processing purposes.

At the same time the transfer of the timing block begins, the browser notes the time at which the transferring of the timing block starts. In step 520, the transfer of the timing block concludes, and the time at which the transfer concludes is also noted by the browser. In step 530, a calculation is made as to the connection speed, i.e., data transfer rate, based on the time required to transfer the timing block and on its known size. In step 535, loading of the preferences page concludes and the possible configurations that the user might have are displayed for the user. In step 540, the user's input with regards to the configuration is received. The process concludes at step 545.

The preferences page can also be displayed at times other than what is described above with respect to FIG. 3. In an embodiment of the invention, the user is given a link in the content provider's web page through which the user can access the preferences page whenever desired. This allows the user to change the stated preferences at will. In another embodiment of the invention, the preferences page is displayed to the user at regular intervals, e.g., every six months. This allows the user to make periodic updates of the configuration information.

With respect to the setting of cookies, when a browser makes a request to a server, the browser only sends up cookies that are associated with the server's domain. A cookie can be associated with a new domain in one of two ways:

1) a Set-Cookie: header is received from a server within the new domain, or
2) the cookie is set via javascript by a page that was loaded from a server in the new domain.

Since the player detection code is not always being run from a delivery management server page (e.g., the case where the player detection is loaded as part of the header of a content provider's web page), a way to set the cookies is needed. The goal is a third party cookie, whereby a cookie that would otherwise be set to the original domain (the content provider's domain) is set instead to the delivery management server's domain. In an embodiment of the invention, this can be done by making a dummy image( ) request from within javascript. Given a request that the image be loaded from the delivery management server's domain, the delivery management server can reply by sending back a Set-Cookie: header.

Figure 6:
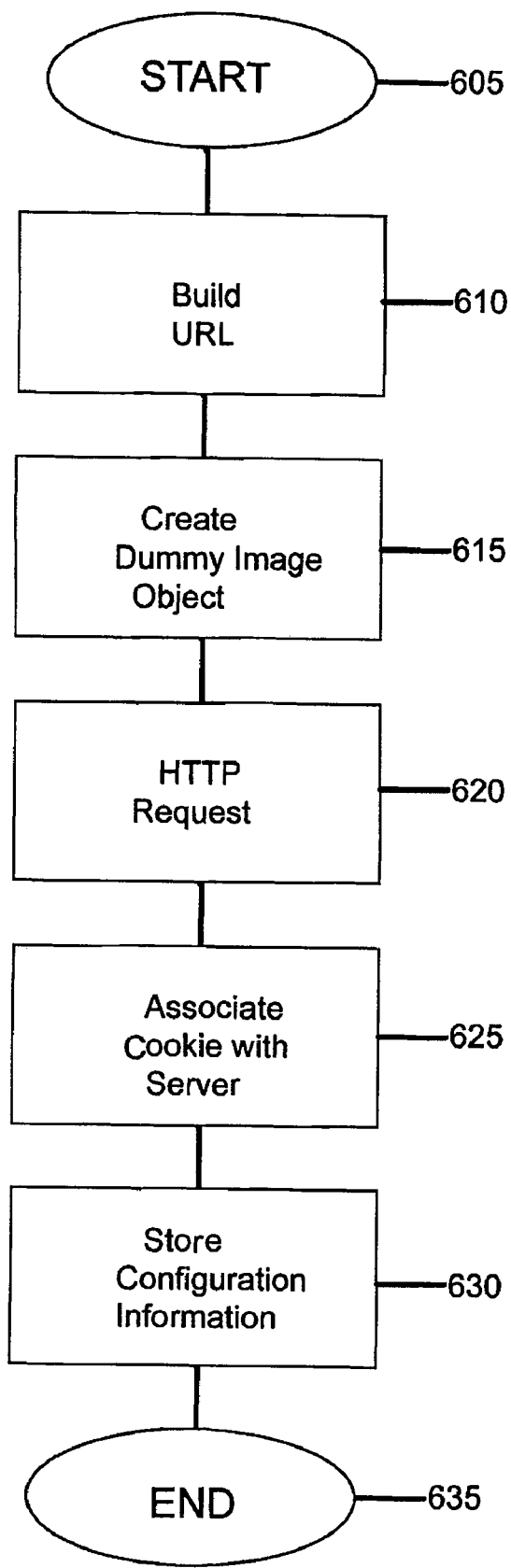
FIG. 6 is a flow chart illustrating the process of setting cookies according to an embodiment of the invention.

This can be applied in steps 330 and 334 above, and is illustrated in FIG. 6. The process begins at step 605. In step 610 a URL is built at the user's computer directed to a cookie set script at the delivery management server. In step 615, a dummy image object is created at the user's computer. This object serves no purpose except to allow a dummy image request to be made, from within javascript, to the domain of the delivery management server. At step 620 the browser makes an HTTP request, asking that a dummy image be loaded from the domain of the delivery management server; this request incorporates a request for the cookie set script. In step 625, the delivery management server responds by associating the cookies with the server (i.e., sending back a Set-Cookie: header). This will allow the cookies to be sent to the delivery management server, even though their presence at the user's computer may have originally been determined by the content provider or some other domain. In step 630, configuration information is stored in the cookies. The process concludes at step 635.

An example of such an exchange between a user and a delivery management server is illustrated below:
GET/ssp/cookieset?gmPlayerPref=real HTTP/1.1
Accept: image/gif, image/x-xbitmap, image/jpeg, image/pjpeg, application/vnd.ms-powerpoint, application/vnd.ms-excel, application/msword, */*
Accept-Language: en-us
Accept-Encoding: gzip, deflate
User-Agent: Mozilla/4.0 (compatible; MSIE 5.5; Windows NT 5.0)
Host: js.genericmedia.net
Connection: Keep-Alive
Cookie:gmPlayers=v1%2F%2FQuickTime-4.12%2F%2FReal-6.0.7.788%2F%2FWMP-6.4%2F%2F; gmPlayerPref=wmf; gmBitratePref=300000
The server then responds:
HTTP/1.1 200 OK
Date: Tue, 12 Jun. 2001 20:08:29 GMT
Server: Apache/1.3.14 (Unix) mod_perl/1.24
Set-Cookie:gmPlayers=v1%2F%2FQuickTime-4.12%2F%2FReal-6.0.7.788%2F%2FWMP-6.4%2F%2F; domain=.genericmedia.net; path=/; expires=Mon, 10-Sep.-2001 20:08:29 GMT
P3P: CP="IND OUR PRE UNI ONL COM"
Set-Cookie: gmPlayerPref=real; domain=.genericmedia.net; path=/;expires=Mon, 10-Sep.-2001 20:08:29 GMT
Connection: close
Cache-Control: no-cache, max-age=1
Transfer-Encoding: chunked
Content-Type: text/html IV. Conclusion While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. A method of transferring requested media data over a network comprising:
    downloading, by a client device from a content provider, a web page containing a server contact code;
    executing the server contact code at the client device to direct a browser of the client device to a delivery management server;
    receiving a request for a detection code from the client device at the delivery management server;
    sending the detection code to the client device;
    executing the received detection code, at the client device, to detect the media player information available on the client device, including determining browser type, and selecting one of plural methods for finding the media player information based upon the determined browser type and the received detection code, wherein the methods include at least (a) a string search and (b) trying to instantiate object for media players;
    storing, at the client device, the media player information in one or more cookies;
    sending the one or more cookies from the client device to the delivery management server;
    verifying at the delivery management server said one or more cookies to have valid settings and sending an acknowledgement to the client device indicating that said one or more cookies are sufficient to format the requested media data;
    sending a request to fetch the requested media data of the web page including sending said one or more cookies under a fetch request from said client device to the delivery management server; and
    formatting the requested media data suitable for the detected media player information and transferring thereof to the client device over the network.

2. The method of claim 1, where in the media player information includes one or more media player types available on the client device.

3. The method of claim 1, wherein the media player detection code comprises logic for a string search of mimetype.

4. The method of claim 1, further comprising storing the detected media player information on the client device.

5. The method of claim 1, further comprising conducting bandwidth measurement.

6. The method of claim 1, wherein the suitable media data is transcoded based on the detected media player information.

* * * * *